(12) United States Patent
Lahmar et al.

(10) Patent No.: US 11,505,490 B2
(45) Date of Patent: Nov. 22, 2022

(54) FIBRE-FORMING PLATE

(71) Applicant: SAINT-GOBAIN ISOVER, Courbevoie (FR)

(72) Inventors: Flavien Lahmar, Avignon (FR); François Vianey, Paris (FR); Jacques Labarthe, Montmorency (FR)

(73) Assignee: SAINT-GOBAIN ISOVER, Courbevoie (FR)

( * ) Notice: Subject to any disclaimer, the term of this patent is extended or adjusted under 35 U.S.C. 154(b) by 61 days.

(21) Appl. No.: 16/629,825

(22) PCT Filed: Jul. 6, 2018

(86) PCT No.: PCT/FR2018/051714
§ 371 (c)(1),
(2) Date: Jan. 9, 2020

(87) PCT Pub. No.: WO2019/012211
PCT Pub. Date: Jan. 17, 2019

(65) Prior Publication Data
US 2021/0087100 A1    Mar. 25, 2021

(30) Foreign Application Priority Data

Jul. 11, 2017 (FR) ...................................... 1770744

(51) Int. Cl.
*C03B 37/04* (2006.01)
(52) U.S. Cl.
CPC ................... *C03B 37/045* (2013.01)

(58) Field of Classification Search
CPC .................................................. C03B 37/045
See application file for complete search history.

(56) References Cited

U.S. PATENT DOCUMENTS 3,020,586 A    2/1962   Charpentier et al.
3,179,507 A *  4/1965   Levecque .............. B60L 15/04
                                               65/514
(Continued)

FOREIGN PATENT DOCUMENTS

EA         18740 B1    10/2013
EP      0 479 675 A2    4/1992
(Continued)

OTHER PUBLICATIONS

International Search Report as issued in International Patent Application No. PCT/FR2018/051714, dated Oct. 17, 2018.
(Continued)

*Primary Examiner* — Cynthia Szewczyk
(74) *Attorney, Agent, or Firm* — Pillsbury Winthrop Shaw Pittman LLP

(57) ABSTRACT

A spinner for fiberizing mineral fibers, in particular glass fibers, by centrifugation from a molten material, includes a peripheral barrel pierced with orifices for the passage of the molten material and for obtaining fibers by drawing during the centrifugation, a wheel center connecting the peripheral barrel to an upper flange for securing the spinner in a fiberizing device, a turnup extending the peripheral barrel in the bottom part of the spinner and making an angle β herewith, wherein the angle β is strictly less than 90°.

20 Claims, 2 Drawing Sheets

(56) References Cited

U.S. PATENT DOCUMENTS

| | | | |
|---|---|---|---|
| 4,203,745 A * | 5/1980 | Battigelli | C22C 19/053 65/461 |
| 4,392,879 A | 7/1983 | Takeuchi et al. | |
| 5,259,857 A | 11/1993 | Pasquier et al. | |
| 5,591,459 A | 1/1997 | Snyder | |
| 6,596,048 B1 | 7/2003 | Tuffal et al. | |
| 2012/0270718 A1 | 10/2012 | Boulanov et al. | |

FOREIGN PATENT DOCUMENTS

| | | |
|---|---|---|
| FR | 1 177 313 A | 4/1959 |
| FR | 2 443 436 A1 | 7/1980 |
| GB | 782 802 A | 9/1957 |
| GB | 834385 A | 5/1960 |
| GB | 917741 A | 2/1963 |
| JP | S37-001165 B | 2/1955 |
| JP | S38-004708 B | 3/1960 |
| JP | S55-113638 A | 9/1980 |
| JP | H06-340442 A | 12/1994 |
| JP | 2002-518282 A | 6/2002 |
| JP | 4477236 B2 | 6/2010 |
| JP | 2013-514961 A | 5/2013 |
| RU | 2127230 C1 | 3/1999 |
| RU | 2005102078 A | 7/2005 |
| WO | WO 99/65835 A1 | 12/1999 |
| WO | WO 02/064520 A1 | 8/2002 |
| WO | WO 2005/052208 A1 | 6/2005 |

OTHER PUBLICATIONS

Notice of Reasons for Refusal as issued in Japanese Patent Application No. 2019-572223, dated Nov. 22, 2021.
Official Action and Search Report as issued in Russian Patent Application No. 2020105867, dated Nov. 11, 2021.

* cited by examiner

FIBRE-FORMING PLATE

CROSS-REFERENCE TO RELATED APPLICATIONS

This application is the U.S. National Stage of PCT/FR2018/051714, filed Jul. 6, 2018, which in turn claims priority to French patent application number 1770744 filed Jul. 11, 2017. The content of these applications are incorporated herein by reference in their entireties.

The invention relates to a fiberizing spinner used in particular for forming mineral fibers for the production of mineral wool, in particular glass wool.

A usual method for producing glass fibers used in insulation applications combines rotary fiberization by centrifugation and fiberization by gas blast attenuation.

At the heart of this method is an essential component intended to allow the molten glass to be drawn into attenuated filaments: this is the spinner disk, also referred to as a centrifuge or even as a "spinner" in the art. It is a bottomless centrifuge, cast in refractory alloy, for example based on chromium as described in application WO2005/052208. One example of such a fiberizing device incorporating a centrifuge or spinner is described for example in application FR2443436 to which reference may be made for further operational details.

In the known way, the lateral part of this component, referred to as the lateral or peripheral barrel, is pierced with multiple holes, the diameter of which is usually of the order of 0.5 to 3 mm. During fiber production, the spinner normally rotates at a rotational speed of around 1500 to 3000 revolutions per minute. Under the action of centrifugal force, the glass is pushed outward and passes through the holes, thereby forming fibers which are then knocked over downward and attenuated by hot gas jets. The spinners are subjected to particularly harsh conditions of use. Firstly, the temperature at the barrel of the spinner is high, as the molten glass is at a temperature of the order of 1000° C. to 1200° C. when it reaches the inside of the fiberizing device. Secondly, the rotation and the fact that there are temperature gradients lead to high mechanical stresses through differential expansion. Lastly, the spinner operates in an environment that is corrosive toward alloys, leading on the one hand to hole erosion, and therefore to structural mechanical weakening, and on the other hand to the alloy becoming impoverished in terms of chrome near the surfaces in contact with the glass and ultimately to mechanical weakening associated with the material. These various factors combine to limit the life of the spinners. These have therefore to be regularly removed and replaced, leading to costly production stoppages or adjustments. In addition, each of these refractory alloy components has a high cost, and this has a not-insignificant impact not only on the efficiency but also on the overall cost of the process.

This set of problems is already well known. There are several possible ways of increasing the life of the spinners: attempts have already been made at modifying the fiberizing conditions or alternatively at optimizing the composition of the alloy to make it more resistant, as described in the publications already cited hereinabove.

Using another approach, U.S. Pat. No. 5,591,459 teaches the addition of an additional device that makes it possible to reduce the deformation of the spinners.

Furthermore, according to a method known from publication WO 02/064520, the fiberizing conditions have evolved with a view to increasing production capabilities and reducing the energy consumption of the process. In that context, the configuration of the spinners incorporates more holes in the barrel thus increasing the cross sectional area available for the passage of the glass. Unfortunately, this solution sometimes leads to a visible degradation in the mechanical strength of the spinners and therefore to a significant reduction in their life, which may be impaired by as much as 25%. The mechanical strength of the spinners needs to be improved in order to extend their life. The photograph in FIG. 1 illustrates one mode of degradation embodied by the appearance of cracks in the sensitive regions of the spinner, in particular horizontal cracks in the middle of the fiberizing barrel.

The invention consists of novel shapes and configurations of spinner that make it possible to reduce the mechanical stresses in the most sensitive part, namely the part most exposed to cracking: the pierced barrel. This modification also makes it possible to maintain the piercing profile of the spinner, configured beforehand to ensure a good quality of end product, for example according to the principles described in publication WO 99/65835. The spinner configurations according to the invention thus make it possible to improve the mechanical behavior of the spinner and the thermomechanical strength/resistance thereof under fiberizing conditions and ultimately to appreciably lengthen the life thereof by reducing the stresses in the barrel. More particularly, by reducing the stresses, the irreversible visco-plastic deformations, which deformations are associated with phenomena of creep, are reduced, making it possible to delay the onset of cracking.

More specifically, according to the present invention, the intention has been to modify the shape of the spinner without adversely affecting the holing parameters (in particular the number, concentration and layout of the holes in the fiberizing barrel). Furthermore, the spinners developed according to the present invention can be used without any modification to the fiberizing throughput or conditions. In contrast with the concepts developed in U.S. Pat. No. 5,591,459, there is incidentally no need for the operator to fit an additional element in order to limit spinner deformation.

More specifically, the present invention relates to a spinner for fiberizing mineral fibers, in particular glass fibers, by centrifugation from a molten material, comprising:
  a peripheral barrel, preferably frustaconical, pierced with orifices for the passage of the molten material and for obtaining fibers by drawing during said centrifugation,
  a wheel center connecting said peripheral barrel to an upper flange for securing the spinner in a fiberizing device,
  a turnup extending said peripheral barrel in the bottom part of the spinner and making an angle β therewith.

According to the present invention, the angle β is strictly less than 90°.

According to advantageous embodiments of the present invention, which may of course and where appropriate be combined with one another:
  the turnup has an angle of inclination α with respect to the horizontal that is less than or equal to 10°.
  The turnup has a total length less than 10% of the total diameter of the spinner.
  The turnup has, over its entire length, a substantially uniform thickness.
  The diameter of the spinner is composed between 200 and 800 mm. What is meant by the diameter of the spinner is, in the conventional way, the diameter obtained from the largest circular outline.
  The turnup has a total length less than 15% of the diameter of the spinner.

The peripheral barrel (2) makes an angle γ comprised between 1 and 10% with the vertical.

The turnup has a total length less than 50% of the length measured, in a radial plane of section, between the exterior edge of the spinner and the interior end of the spinner-securing flange.

The angle β is strictly less than 87° and in particular is less than 85°.

The angle α is strictly less than 5° and in particular is less than 2° or even zero.

The invention also relates to the use of a spinner as previously described in a method for fiberizing a glass wool or a mineral wool.

The invention finally relates to a method for fiberizing a glass wool or mineral wool using such a spinner.

For a better understanding of the subject matter of the present invention, two spinners are described hereinafter: a first spinner configured according to the current techniques of the art and a second spinner according to the present invention, using the illustrations attached hereto in FIGS. 2 and 3 respectively.

Figure 2:
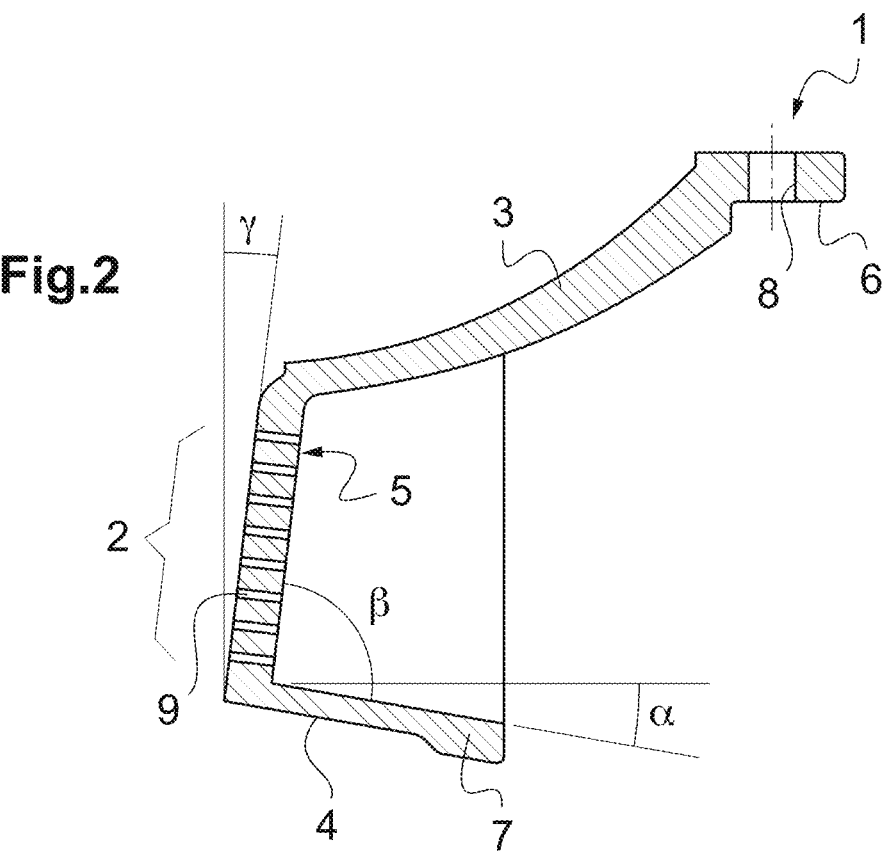
FIG. 2 schematically indicates part of a fiberizing spinner according to the current state of the art.

FIG. 2 schematically indicates part of a fiberizing spinner 1 according to the current state of the art, in a transverse plane of section with respect to the axis of revolution of said spinner.

Figure 1:
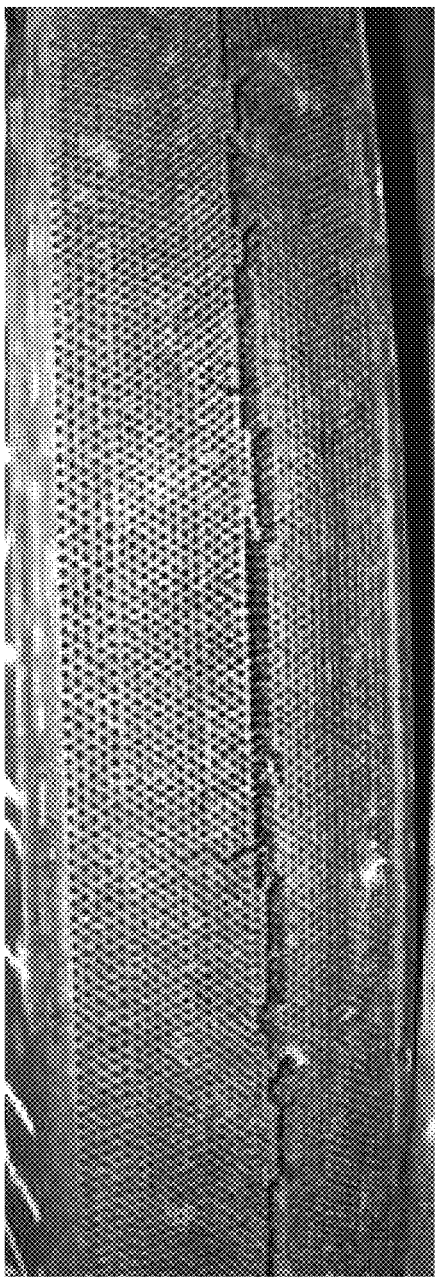
FIG. 1 illustrates cracks in the sensitive regions of a spinner.

In operation, the spinner 1 is fixed to a shaft (not depicted in the figure) which drives its rotation. The shaft and the spinner are driven with a rotational movement. The shaft is hollow and glass in the molten state flows from feed means not depicted along the shaft as far as a basket (likewise not depicted in FIG. 1) in which the molten glass spreads out. The basket is also rotationally driven so that the molten glass is thrown against the internal wall 5 of the barrel 2, forming a permanent reserve of molten glass on this wall. This reserve feeds circular orifices 9 pierced in said wall 5 and opening to the outside of the peripheral barrel 2 of the spinner. This barrel 2 is usually inclined by an angle γ of around 5 to 10° with respect to the vertical, so that it adopts a frustaconical shape. A great many circular orifices, of which the size, concentration and distribution have been optimized according to conventional techniques, in particular as described in application WO 02/064520, leave the flow cones, extending into pre-fibers, thrown into the annular stream of gas emitted by the burner. Under the action of this stream, these pre-fibers are attenuated, their end portion generating discontinuous fibers (not depicted) which are then collected under the spinner for example on a belt on which the fibers accumulate to form a mat. Other collection means may obviously also be envisaged according to the invention, in particular when the insulation end product is intended to be sold loose.

As indicated previously, implementation of such a device leads to intense mechanical thermal stresses on the pierced wall 5.

Figure 3:
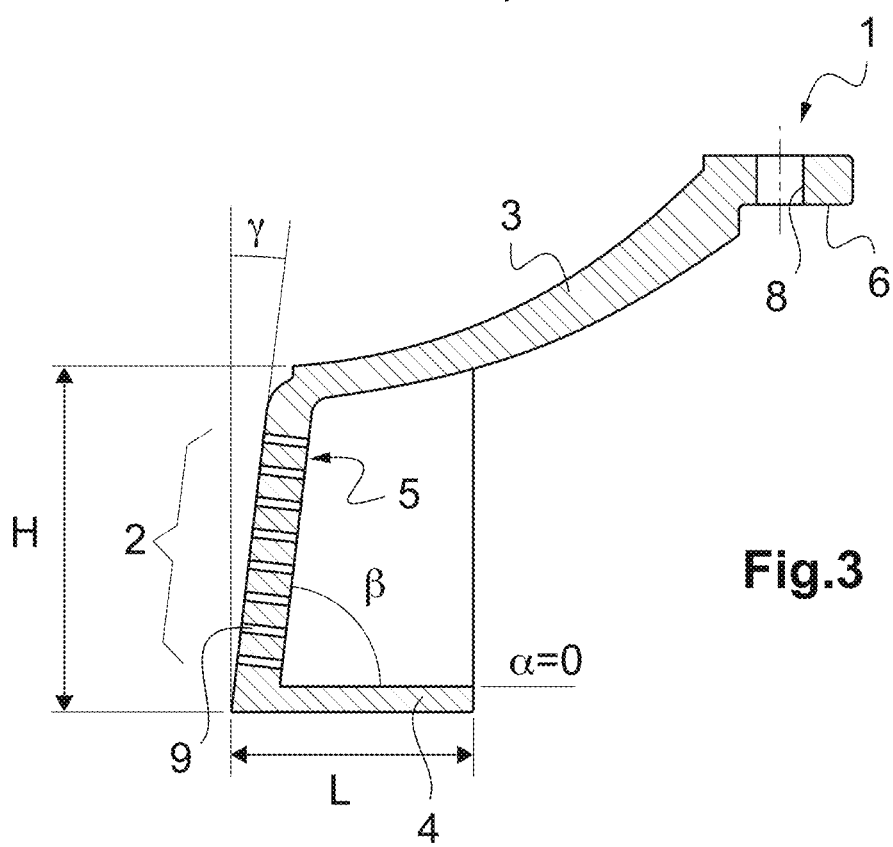
FIG. 3 depicts a fiberizing spinner according to the invention.

FIG. 3 merely summarizes the left-hand part of a fiberizing spinner 1 according to the invention. The spinner 1 comprises an upper part consisting of an upper fixing flange 6 comprising machined orifices 8 for attaching it to a suitably adapted support and allowing it to be rotationally driven during the fiberizing process described hereinabove. This upper fixing part 6 is connected to the peripheral barrel 2 the wall 5 of which is pierced with holes 9 by a curved portion referred to in the art as a wheel center 3. The peripheral barrel 2 is this time connected at its lower end to a turnup 4 extending said barrel in the bottom part of the spinner and making an angle β therewith.

The turnup 4 extends radially toward the center of the spinner 1. It allows the molten glass to be collected and concentrated near the wall 5 of the pierced barrel before it is fiberized using the principles described hereinabove.

In the current state of the art, the turnup conventionally is at an angle α greater than or equal to 10° to the horizontal, as indicated in FIG. 2. What is meant within the meaning of the present invention by horizontal is the horizontal plane of reference defined when the spinner is positioned in the fiberizing device. Such a configuration is chosen in the prior art because it appeared to be the configuration most likely to limit the thermomechanical stresses at the junction between the bottom part of the pierced barrel and the turnup. It was thus hitherto believed that the opening associated with that angle α would make it possible to limit stress and thus extend the life of the spinner, particularly by making it possible to adjust the angle β formed at the junction between the barrel 2 and the turnup 4, according to said plane of section, to a value greater than or equal to 90°.

The length of the turnup 4 is generally long enough to avoid any risk of the glass that has accumulated against the wall overspilling out of the spinner.

According to another technique conventionally adopted, the turnup has, in its extreme part, which means to say in its part closest to the center of the spinner, material reinforcement or a reinforcer 7. This additional material is supposed to reinforce the reinforcement itself at its end, in order also to avoid cracks in the most highly stressed part thereof.

The attached FIG. 3 depicts a fiberizing spinner according to the invention, in the same plane of section as was used in example 1.

Unlike in the spinner of FIG. 2, the angle β formed at the junction between the barrel 3 and the turnup 4 this time has a value strictly less than 90°, as depicted in FIG. 3. In particular, the angle β is advantageously less than 89°, in particular less than 88°, or even less than 87°, or again even less than 86° or even less than 85°, or most preferably still, less than 84°.

The spinner according to the invention comprises a turnup at an angle α to the horizontal that is less than 10°, in particular less than 9°, or even less than 8°, or again even less than 7° or even less than 6°, or even less than 5°. According to one possible and advantageous embodiment, the angle α is close to or equal to 0, which means to say close to horizontal. In such an embodiment, the angle α may for example be less than or equal to 4°, less than or equal to 3°, less than or equal to 2° or even less than 1°.

Furthermore, unlike the spinner according to the prior art, in the preferred spinner depiction given in FIG. 3, the reinforcer 7 has been omitted from the configuration according to the invention. This is because the applicant company discovered that such a reinforcer could have detrimental effects by notably increasing the stress loadings in the bottom part of the barrel 2. Thus in the configuration described in FIG. 3 a turnup having a thickness that is substantially uniform along its entire length is proposed.

According to one advantageous embodiment of the invention, it has also been able to be demonstrated experimentally, as described hereinafter, that the best results in terms of spinner life are obtained for spinners having an angle β or an angle α as described hereinabove in connection with FIG. 3 and in which the length L of the turnup is reduced, and in particular does not exceed 10% of the diameter of the spinner, without this in any way implying risks of the molten glass overspilling. In particular, the preferred spinners according to the invention have the following features:

- turnup lengths comprised between 5.0 and 9.5% of the diameter of the spinner, preferably between 7.0 and 9.0% of the diameter of the spinner,
- angles α respectively comprised between 0 and under 10° and/or
- angles β comprised between 80 and under 90°, in particular between 80 and 88°, particularly comprised between 82 and 86°.

Such spinners have demonstrated the best lives in glass fiber fiberizing tests.

The following examples make it possible to illustrate the advantages and superior performance of spinners configured according to the present invention, but are purely illustrative and should not be considered as limiting the present invention in any one of the aspects described.

Spinners of diameter D=400 mm were cast in the configurations according to FIG. 2 (current state of the art) and 3 (according to the invention) in the metal alloy described in example 2 of application EP511099, for the fiberizing of a glass composition of the borosilicate-soda-lime glass type.

The key geometric data for the two types of spinner used are given herein below.

TABLE 1

|  | Configuration according to the prior art (FIG. 2) | Configuration according to the invention (FIG. 3) |
|---|---|---|
| Angle β | 90° | 83° |
| Angle α | 10° | 0° |
| Angle γ | 7° | 7° |
| L (cm) | 40 | 35 |
| L/D | 0.1 | 0.087 |
| H (cm) | 50 | 50 |

L: length of the turnup
D: diameter of the spinner
H: height of the barrel

The experimental results achieved under actual fiberizing conditions, performed over a population of 30 components for each of the two types of spinner, demonstrated a mean increase in spinner life for spinners according to the configuration according to the present invention of the order of 15% in comparison with the conventional configuration.

The invention claimed is:

1. A spinner for fiberizing mineral fibers, by centrifugation from a molten material, comprising:
    a peripheral barrel pierced with orifices for the passage of molten material and for obtaining fibers by drawing during said centrifugation,
    a wheel center connecting said peripheral barrel to an upper flange for securing the spinner in a fiberizing device,
    a turnup extending said peripheral barrel in the bottom part of the spinner, said turnup having an inner surface forming part of an interior of the spinner and an outer surface, opposite said inner surface, forming part of a bottom surface of the spinner that faces an exterior environment, and the inner surface of the turn up making an angle β with the peripheral barrel,
    wherein the angle β is strictly less than 90°, and
    wherein the spinner is a bottomless spinner.
2. The spinner as claimed in claim 1, wherein the turnup has an angle of inclination α with respect to the horizontal that is less than or equal to 10°.
3. The spinner as claimed in claim 2, wherein the angle α is strictly less than 5°.
4. The spinner as claimed in claim 3, wherein the angle α is strictly less than 2°.
5. The spinner as claimed in claim 4, wherein the angle α is zero.
6. The spinner as claimed in claim 1, wherein the turnup has a total length less than 10% of a total diameter of the spinner.
7. The spinner as claimed in claim 1, wherein the turnup has, over its entire length, a substantially uniform thickness.
8. The spinner as claimed in claim 1, a diameter of which is comprised between 200 and 800 mm.
9. The spinner as claimed in claim 1, wherein the turnup has a total length less than 15% of a diameter of the spinner.
10. The spinner as claimed in claim 1, wherein the peripheral barrel makes an angle γ comprised between 1 and 10° with the vertical.
11. The spinner as claimed in claim 1, wherein the turnup has a total length less than 50% of the length measured, in a radial plane of section, between an exterior edge of the spinner and an interior end of the spinner-securing flange.
12. The spinner as claimed in claim 1, wherein the angle β is strictly less than 87°.
13. The spinner as claimed in claim 1, wherein the angle β is strictly less than 85°.
14. A method comprising utilizing a spinner as claimed in claim 1 for fiberizing a glass wool or a mineral wool.
15. The spinner as claimed in claim 1, wherein the mineral fibers are glass fibers.
16. The spinner as claimed in claim 1, wherein the peripheral barrel is frustoconical.
17. The spinner as claimed in claim 1, wherein the angle β is strictly less than 84°.
18. A spinner for fiberizing mineral fibers, by centrifugation from a molten material, comprising:
    a peripheral barrel pierced with orifices for the passage of molten material and for obtaining fibers by drawing during said centrifugation,
    a wheel center connecting said peripheral barrel to an upper flange for securing the spinner in a fiberizing device,
    a turnup extending said peripheral barrel in the bottom part of the spinner and making an angle β with the peripheral barrel,
    wherein the angle β is strictly less than 87°,
    wherein the turnup has a total length less than 50% of the length measured, in a radial plane of section, between an exterior edge of the spinner and an interior end of the spinner-securing flange, and
    wherein the spinner is a bottomless spinner.
19. The spinner as claimed in claim 18, wherein the angle β is strictly less than 85°.
20. The spinner as claimed in claim 18, wherein the turnup has an angle of inclination α with respect to the horizontal that is less than or equal to 2°.

* * * * *